2 Sheets—Sheet 1.
J. S. ROYCE.
HARVESTER.
No. 34,849. Patented Apr. 1, 1862.
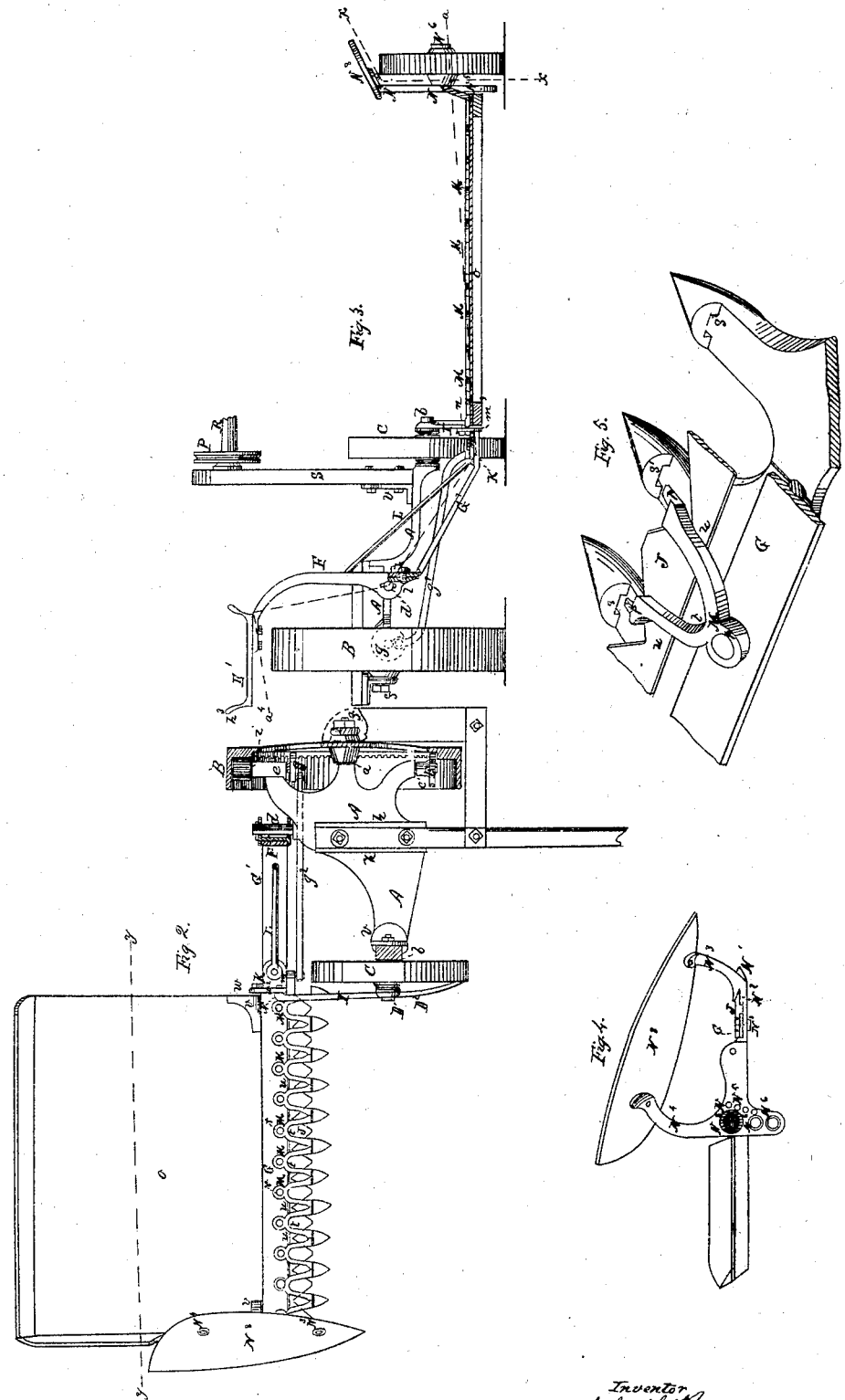
Witnesses
Gustavus Dieterich
E. T. Jacob
Inventor
John S. Royce
by his Attorneys
Mason, Fenwick & Lawrence
Washington D.C.

2 Sheets—Sheet 2.
J. S. ROYCE.
HARVESTER.
No. 34,849. Patented Apr. 1, 1862.
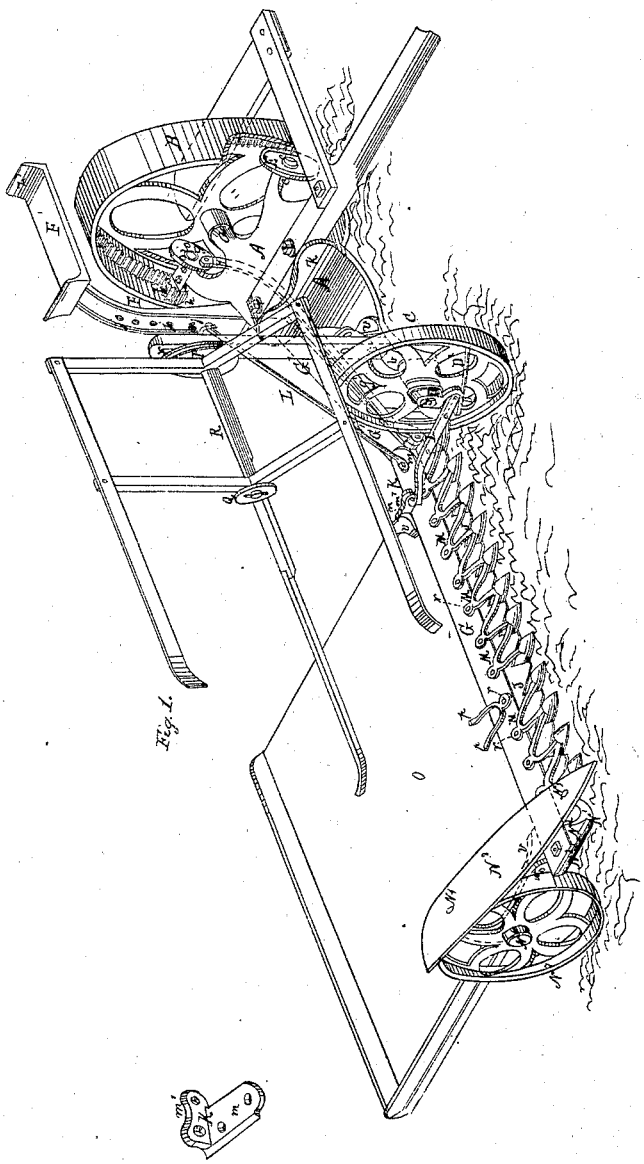

UNITED STATES PATENT OFFICE.

JOHN S. ROYCE, OF CUYLERVILLE, NEW YORK.

IMPROVEMENT IN HARVESTERS.

Specification forming part of Letters Patent No. 34,849, dated April 1, 1862.

*To all whom it may concern:*

Be it known that I, JOHN S. ROYCE, of Cuylerville, in the county of Livingston and State of New York, have invented a new and useful Improvement in Reaping and Mowing Machines; and I do hereby declare that the following is a full, clear, and exact description of the same, reference being had to the accompanying drawings, forming part of this specification, in which—

Figure 1 is a perspective view of a harvester with my improvements applied to it. Fig. 2 is a horizontal section of the same. Fig. 3 is a vertical transverse section, looking from the rear, in the line $y\,y$. Fig. 4 is a vertical section in the line $x\,x$. Fig. 5 is a perspective view of a portion of the cutting apparatus.

Similar letters of reference in each of the several figures indicate corresponding parts.

My improvements relate, first, to a novel construction of side draft-frame; second, to a novel mode of arranging the cutting apparatus with relation to the driver's seat and draft-frame; third, to a novel arrangement of the brace and hinge-connection of the cutting apparatus and the track-clearing wheel; fourth, to a novel arrangement of a friction-wheel; fifth, to a novel angular brace, which serves as a support to the cutter-bar, as a guide to the sickle, and as a hinge-connection for the platform; sixth, to a novel arrangement of guard on the axle of the track-clearing wheel; seventh, to angular hinge-pieces of the platform; eighth, to a novel construction of finger-guard; ninth, to a novel arrangement of supports for the grain-side deflecting-board; tenth, to a novel construction of grain-side wheel bearing or bracket for supporting and adjusting the platform upon; eleventh, to a novel arrangement of the arms of the reel on a disk and a pulley which revolve upon a still shaft.

To enable others skilled in the art to make and use my invention, I will proceed to describe its construction and operation.

A represents a metal plate approximating in form to a triangle, but with irregular sides. This plate, with other parts hereinafter described, constitutes the side draft-frame of a harvester.

$a\,b\,c\,d\,e$ are journals and a journal-box, cast on and between the corners of the plate A, as shown.

On the journal $a$ the internally-toothed driving-wheel B of the harvester is secured, being confined by means of a screw-thread and nut $f$ or key.

On the journal $b$ the intermediate track-clearing wheel, C, is arranged, and on the extreme end of said journal a casting, D, constituting a socket-bearing, D', and a guard, D$^2$, is confined by means of a key or nut, said key finding in the upper portion of the casting the property of a washer.

On the journal $c$ a friction-wheel, E, is placed, said wheel being of sufficient diameter to bear snugly against a smooth surface of the inner face of the driving-wheel.

In the bearing-box $e$ is arranged a short shaft, $i$, on one end of which is fastened an eccentric, $g$, to which a pitman, $g'$, attaches, and on the other end a pinion, $h$, which transmits the motion of the driving-wheel to the eccentric and pitman.

On the journal $d$ is arranged a lever-standard, F. This standard has a curved form as it rises from its axis $d$, and is perforated with a number of adjusting-holes, $j\,j$. On its curved portion, which extends over the driving-wheel B, a seat, F', for a driver is secured. It will be observed that the standard is in rear of the draft-frame and in line with the cutting apparatus; also, that its curved form locates the driver nearly directly over the driving-wheel B, and thus the weight of the driver can be very advantageously employed, accordingly as it is thrown upon the different parts of the seat, for swinging the standard on its axis $d$. The standard is connected to the wrought-iron finger-beam G by means of an angular extension, G', said extension being fastened to the perforated portion of the standard by means of a screw-bolt and nut, as shown at $k\,l$, the screw passing through one or another of the holes $j$, accordingly as it is desired to set the cutting apparatus with relation to the ground. In order to strengthen and stay the finger-beam and prevent an undue or twisting strain on the finger-beam thus connected, an angular casting, K, a hinged brace, I, and a stiff adjustable brace, L, are applied, as follows:

The casting K is bolted to the top of the finger-beam at the point where the first bend is made in it, and its horizontal portion $m$ extends slightly beyond the front edge of the finger-beam and laps over the sickle J, while its vertical portion $m'$ extends beyond the rear edge of the finger-beam. From the vertical portion $m'$ the hinged stay-rod I extends forward and fits in the socket-bearing $D'$, and attaches loosely to the same by a pivot. It will be observed that this stay-rod has two axes, one on the casting K at $n$ and the other on the bearing $D'$ at $o$. It will also be observed that the front end of the stay-rod I is below the axis of the wheel C, and therefore the cutting apparatus can rise a considerable distance before the wheel C is affected by the adjustment being imparted to it. The stiff brace L extends from the horizontal part of the casting K to the standard F, and enters one or another of the holes $j$, accordingly as it is desired to set the cutting apparatus with relation to the ground.

In this connection it may be well to refer to the guard $D^2$, and state that its object is to lay the grain and prevent it twisting in between the spokes or arms of the wheel C and interfering with the free rotation of the wheel. I will also refer to the friction-wheel E, and state that by having it located within the wheel it is protected from trash and dirt, and therefore operates very perfectly. Its office is to insure a thrust on one corner of the draft-frame sufficient to keep the pinion $h$ on another corner thereof in gear with the driving-wheel. In case the parts, from wear, should work too loose, the same can be tightened up by screwing up the nut $f$ on the end of the driving-wheel axle.

To further improve the harvester I make the finger-guards M of a V form, and with tenons $p$ $p$ and pivot-holes $r$, and insert the tenon of one prong of one guard in a mortise, $s$, of one finger and the tenon of the other prong in a mortise, $s'$, of an adjoining, or rather contiguous, finger, and then firmly pivot the guard to the finger-beam, as shown. The next guard is applied by inserting one of its tenons in the mortise $s'$ and its other tenon in a mortise, $s^2$, and thus the whole series of guards are applied.

It should be understood that the mortise of all the fingers, except the first and last ones, is wide enough to just snugly receive two tenons. This construction of guard hugs the grain at $t$ and allows a free escape of trash at $u$. It also lessens the trouble of casting the parts and repairing.

To hinge the platform and at the same time increase its strength, angular castings $v$, with hinge-pintles $w$, are fastened across the joints of the framing of the platform, as shown. The pintles pass into the castings K and N, the casting N serving also, by its construction at $N'$, as a grain-side runner or divider, and by its construction at $N^2$ as a support for the finger-beam and as a guide for the sickle, and by its construction at $N^3$ $N^4$ as standards to support the grain-side deflecting-board $N^5$, and by its construction at $N^5$ as an adjusting-support to the platform, and by its construction at $N^6$ as a support for the journal of the grain-side wheel $N^7$, as will be clearly seen from the drawings.

In constructing the platform I prefer to clamp sheet-zinc O between wood cleats and guards, and to render strong the joints of the lower cleats the same castings which serve as the hinge-supports of the platform are fastened across the same, as before mentioned.

By having the casting N serve the several functions named, the harvester is simplified and facilities for adjusting the platform are afforded.

To further improve the harvester, the arms of the reel are attached directly to the face of the pulley P and to the face of a disk, Q, and said parts P and Q are fitted loosely on a still shaft, R. Thus constructing the parts lessens the amount of power required to operate the reel as the weight of the shaft is thrown off.

The reel is hung on a vertical standard, S, which has an oblong slot, $x$, for the shaft of the reel to be adjusted up and down in. The standard is pivoted to a cast foot, U, of the side draft-frame, said foot being bolted to the frame, and having adjusting-holes arranged on a circle cut through its vertical portion, for the purpose of setting the reel post or standard forward or backward, in either of which positions it is held firmly by a screw-bolt and nut.

In order to secure the tongue firmly from lateral play, two ribs, $z$ $z$, are cast on the top of the plate A, and between these ribs the tongue is set and then bolted down, as shown; and in order to guard the pinion $h$ from dirt a scraper-shield, $z'$, is cast on the plate A, so that as the wheel B revolves the inside of the flaring flange or tread of the wheel shall be scraped and any accumulation of dirt or trash thrown out of the wheel.

To convert the machine described into a mower, I take off the platform and the grain-side wheel and the casting N. For the latter a suitable guard-shoe is substituted. The cutting apparatus is then set nearer the ground by changing the height of the connections of the lever-standard.

From the foregoing description it is obvious that if the driver shifts his position on the seat so as to bring his weight nearer to the end $z^3$ of the seat the lever-brace F will be caused to assume the position illustrated by a red line, $a^4$, and in assuming this position the cutting apparatus will be thrown up higher, as illustrated by the continuation $a^5$ of said red line. Thus the cutting apparatus is perfectly controlled by the driver's weight, and, besides this, the weight of the driver balances the weight on the horses.

What I claim as my invention, and desire to secure by Letters Patent, is—

1. The side draft-frame, A, provided with the journals $a$ $b$ $c$ $d$ and bearing-box $e$, or their equivalents, constructed and applied substantially as and for the purposes set forth.

2. The arrangement of the friction-wheel $c$ within the driving-wheel, and in the relation to the pinion $h$, substantially as and for the purposes set forth.

3. The lever-standard F, with driver's seat attached, and connected to and arranged in line, or nearly so, with the cutting apparatus, and in rear of the draft-frame, substantially as and for the purposes set forth.

4. The arrangement of the hinged brace I, in connection with the socket-bearing D' of the intermediate grain-wheel, C, substantially as and for the purposes described.

5. The socket-bearing D' and guard $D^2$, arranged in combination with the intermediate grain-wheel, C, substantially as and for the purpose set forth.

6. The arrangement, with the platform, angular brace K, and shoe or divider N, of the angular hinged braces $v$ $w$, substantially as and for the purposes described.

7. The construction of the finger-guards of V form, and with pivot-holes and tenons, in combination with the mortised fingers, substantially as and for the purposes set forth.

8. The shoe or divider consisting of the parts N N' $N^2$ $N^3$ $N^4$ $N^5$ $N^6$, made in one piece, substantially as and for the purposes described.

9. Providing the shoe N with the perforations $N^5$, for the purpose of adjusting the hinged platform in the manner described.

10. Attaching the arms of the reel to the faces of a pulley and disk which revolve on a still shaft, in the manner and for the purpose described.

JOHN S. ROYCE.

Witnesses:
J. M. CONNEL,
GUSTAVUS DIETERICH.